(12) United States Patent
Silkowski

(10) Patent No.: US 8,667,773 B2
(45) Date of Patent: Mar. 11, 2014

(54) COUNTER-ROTATING TURBOMACHINERY

(75) Inventor: Peter D. Silkowski, Middletown, CT (US)

(73) Assignee: United Technologies Corporation, Hartford, CT (US)

(*) Notice: Subject to any disclaimer, the term of this patent is extended or adjusted under 35 U.S.C. 154(b) by 295 days.

(21) Appl. No.: 13/170,496

(22) Filed: Jun. 28, 2011

(65) Prior Publication Data
US 2013/0000322 A1 Jan. 3, 2013

(51) Int. Cl.
*F02C 7/057* (2006.01)
*F02C 9/00* (2006.01)
*F02G 3/00* (2006.01)
*F23R 3/26* (2006.01)

(52) U.S. Cl.
USPC ............. 60/39.23; 60/226.3; 60/771; 60/792; 415/148; 415/149.2; 415/149.4; 415/151; 415/159; 415/165; 415/136; 415/137; 415/65; 415/68; 415/69; 416/126; 416/128

(58) Field of Classification Search
USPC ............... 60/226.3, 771, 39.23, 792; 415/65, 415/68–69, 148, 149.2, 149.4, 151, 155, 415/159, 165, 136–137; 416/23, 193 A, 416/126, 128, 129
See application file for complete search history.

(56) References Cited

U.S. PATENT DOCUMENTS

| | | | |
|---|---|---|---|
| 3,861,823 A * | 1/1975 | Serovy | ............................ 415/147 |
| 4,936,526 A | 6/1990 | Gries | |
| 5,340,279 A | 8/1994 | Cycon et al. | |
| 5,351,913 A | 10/1994 | Cycon et al. | |
| 5,364,230 A | 11/1994 | Krauss et al. | |
| 5,911,679 A * | 6/1999 | Farrell et al. | ............... 60/39.183 |
| 6,339,927 B1 | 1/2002 | DiPietro, Jr. | |
| H2032 H | 7/2002 | DiPietro, Jr. | |
| 7,716,914 B2 | 5/2010 | Schilling | |
| 7,905,083 B2 | 3/2011 | Orlando et al. | |
| 7,921,634 B2 | 4/2011 | Orlando et al. | |
| 7,926,259 B2 | 4/2011 | Orlando et al. | |
| 8,191,352 B2 * | 6/2012 | Schilling | ......................... 60/268 |
| 8,209,952 B2 * | 7/2012 | Ress, Jr. | ...................... 60/226.1 |
| 2009/0211221 A1 | 8/2009 | Roberge | |
| 2010/0162720 A1 * | 7/2010 | Bowman et al. | ................. 60/773 |
| 2013/0000314 A1 * | 1/2013 | McCaffrey | ...................... 60/773 |

FOREIGN PATENT DOCUMENTS

EP 1340903 B1 4/2011

* cited by examiner

*Primary Examiner* — Phutthiwat Wongwian
*Assistant Examiner* — Craig Kim
(74) *Attorney, Agent, or Firm* — Kinney & Lange, P.A.

(57) ABSTRACT

A turbomachine comprises a flow duct with coaxially arranged radially inner and outer endwalls, first and second sets of axially spaced rotor stages arranged between the inner and outer endwalls, and a plurality of variable endwall segments arranged along the inner endwall. The first set of rotor stages rotates in a first direction, and the second set rotates in a second direction. The first and second sets alternate in axial series along the flow duct, such that axially adjacent rotor stages rotate in different directions. The variable endwall segments are radially positionable, in order to regulate loading on the first and second sets of rotor stages by changing a cross-sectional flow area between the inner and outer endwalls.

25 Claims, 4 Drawing Sheets

COUNTER-ROTATING TURBOMACHINERY

BACKGROUND

This invention relates generally to turbomachinery, and specifically to rotary turbine and compressor components. In particular, the invention concerns counter-rotating turbomachinery for the turbine and compressor sections of a gas turbine engine.

Gas turbine engines (or combustion turbines) are built around a power core made up of a compressor, combustor and turbine, arranged in flow series with an upstream inlet and downstream exhaust. The compressor compresses air from the inlet, which is mixed which fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation, industrial power generation, and commercial heating and cooling. Small-scale engines such as auxiliary power units typically utilize a one-spool design, with co-rotating compressor and turbine sections. Larger-scale engines including jet engines and industrial gas turbines (IGTs) are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Ground-based industrial gas turbines can be quite large, utilizing complex spooling systems for increased efficiency. Power is delivered via an output shaft connected to a mechanical load, such as an electrical generator, blower or pumping system. Industrial turbines can also be configured for combined-cycle operation, in which additional energy is extracted from the exhaust stream, for example in a low pressure steam turbine.

Aviation applications include turbojet, turbofan, turboprop and turboshaft engines. Turbojet engines are an older design, in which thrust is generated primarily from the exhaust. Modern fixed-wing aircraft typically employ turbofan and turboprop configurations, in which the low pressure spool is coupled to a propulsion fan or propeller. Turboshaft engines are used on helicopters and other rotary-wing aircraft.

Turbofan engines are commonly divided into high and low bypass designs. High-bypass turbofans generate most of their thrust via the fan, which drives airflow through a bypass duct oriented around the engine core. Low-bypass turbofans generate proportionally more power from the exhaust flow, delivering greater specific thrust but at some cost in noise and fuel efficiency, and are used on supersonic fighters and other high-performance aircraft. Unducted (open rotor) turbofans and ducted turboprops are also known, including counter-rotating and aft-mounted configurations.

Gas turbine engine performance depends on precise control of the working fluid flow, and on the relative loading of the various high and low pressure components. In particular, performance depends on efficient load transfer between rotor stages in the turbine and compressor sections, and on careful management of the axial flow velocity, including endwall contributions and the effects of relative Mach number on the performance of sequentially spaced rotor components in the compressor and turbine sections.

SUMMARY

This invention concerns a counter-rotating turbomachine. The turbomachine includes a flow duct with coaxially oriented radially inner and outer endwalls, and two sets of axially spaced counter-rotating rotor blade stages. The second set of rotor blade stages are arranged in between the first set, so that the first and second sets alternate in an axial series, with axially adjacent rotor blade stages rotating in different directions.

A number of variable endwall segments are arranged along the inner endwall of the flow duct. The endwall segments are positioned in a radial sense to increase or decrease the cross-sectional flow area between the inner and outer endwalls, in order to regulate the flow velocity and loading on the two sets of counter-rotating rotor stages.

DETAILED DESCRIPTION

Figure 1:
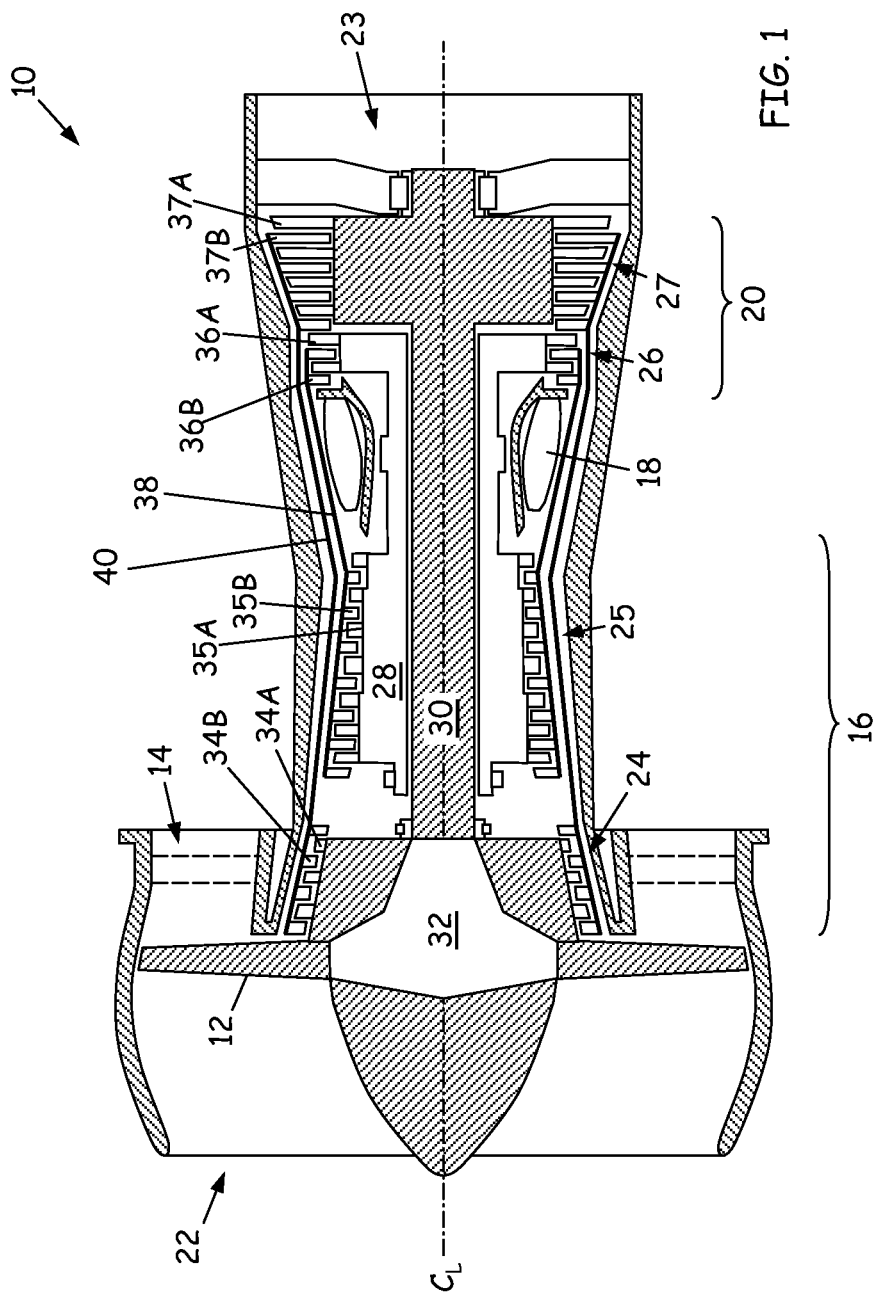
FIG. 1 is a cross-sectional view of a gas turbine engine with counter-rotating compressor and turbine stages.

FIG. 1 is a cross-sectional view of gas turbine engine 10, in a turbofan configuration. As shown in FIG. 1, turbine engine 10 includes propulsion rotor (or fan) 12, bypass duct 14, compressor section 16, combustor 18 and turbine section 20. Air flow from inlet 22 is accelerated by fan 12, splitting into bypass flow through bypass duct 14 and core flow into compressor section 16. Compressed air from compressor section 16 is mixed with fuel in combustor 18 and ignited to generate combustion gas, which drives turbine section 20 and exits through exhaust nozzle 23.

In the two-spool, counter-rotating configuration of FIG. 1, compressor section 16 comprises low pressure compressor (LPC) 24 and high pressure compressor (HPC) 25, and turbine section 20 comprises high pressure turbine (HPT) 26 and low pressure turbine (LPT) 27. High pressure (HP) shaft 28 couples high pressure compressor 25 to high pressure turbine 26, and low pressure (LP) shaft 30 couples low pressure compressor 24 to low pressure turbine 27. Low pressure shaft 30 is also coupled to propulsion fan 12, with gear mechanism 32 to provide independent speed control.

In contrast to traditional gas turbine engine designs, compressor and turbine sections 16 and 20 of gas turbine engine 10 are not formed by alternating rows of rotor blades and stator vanes. Instead, a set (or plurality) of co-rotating compressor and turbine stages 34A-37A alternate with a set (or plurality) of counter-rotating compressor and turbine stages 34B-37B, forming an axially adjacent series of counter-rotating rotor blade stages in each of low pressure compressor 24, high pressure compressor 25, high pressure turbine 26 and low pressure turbine 27.

By configuring each row of compressor and turbine blades as a rotor stage, gas turbine engine 10 creates the same work interaction with the fluid flow as in a traditional turbine design, but with a shorter, lighter configuration, smaller blade count, reduced turning flow and lower rotational speeds. Reduced rotational speeds also alleviate the issue of high relative Mach number between alternating rotor stages, and can be leveraged into additional weight savings due to the lower centrifugal stress.

The counter-rotating (or contra-rotating) design of gas turbine engine 10 also provides greater flexibility in shaft and spool configurations. In the two-spool, high-bypass counter-rotating configuration of FIG. 1, for example, high pressure shaft 28 couples rotor stages 35A of high pressure compressor 25 to co-rotating stages 36A of high pressure turbine 26, forming a radially inner, co-rotating high pressure spool along rotational axis (engine centerline) $C_L$. Counter-rotating, radially outer HP spool 38 is coaxially oriented about high pressure shaft 28, coupling counter-rotating stages 35B of HP compressor 25 to counter-rotating stages 36B of HP turbine 26.

Similarly, low pressure shaft 30 couples rotor stages 34A of low pressure compressor 24 to co-rotating stages 37A of low pressure turbine 27, forming a radially inner, co-rotating low pressure (LP) spool or low spool. Counter-rotating, radially outer LP spool 40 is coaxially oriented about LP shaft 30, coupling counter-rotating stages 34B of LP compressor 24 to counter-rotating stages 37B of LP turbine 27. Co-rotating (inner) HP shaft 28, counter-rotating (outer) HP spool 38, co-rotating (inner) LP shaft 30, and counter-rotating (outer) LP spool 40 each rotate at different speeds, with HP shaft 28 and LP shaft 30 rotating in one direction about centerline $C_L$, and counter-rotating spools 38 and 40 rotating in the other.

Depending on configuration, LP compressor 24 may also function as a booster or intermediate pressure (IP) compressor, or be eliminated altogether. In addition, some gas turbine engines 10 utilize a three-spool design, with separate (counter-rotating) low, intermediate and high pressure spools. Gas turbine engine 10 may also be configured as either a high-bypass or a low-bypass turbofan engine, or an unducted turbofan, turboprop or turboshaft engine.

Alternatively, turbine engine 10 comprises an auxiliary power unit or large-scale industrial gas turbine, and the spool and shaft configurations vary accordingly. In particular, individual spool and shaft assemblies can be combined or further subdivided, and additional gear mechanisms can be provided to regulate load transfer among the various co-rotating and counter-rotating components, as described below, providing independent speed control of the individual compressor and rotor spools and stages.

Figure 2A:
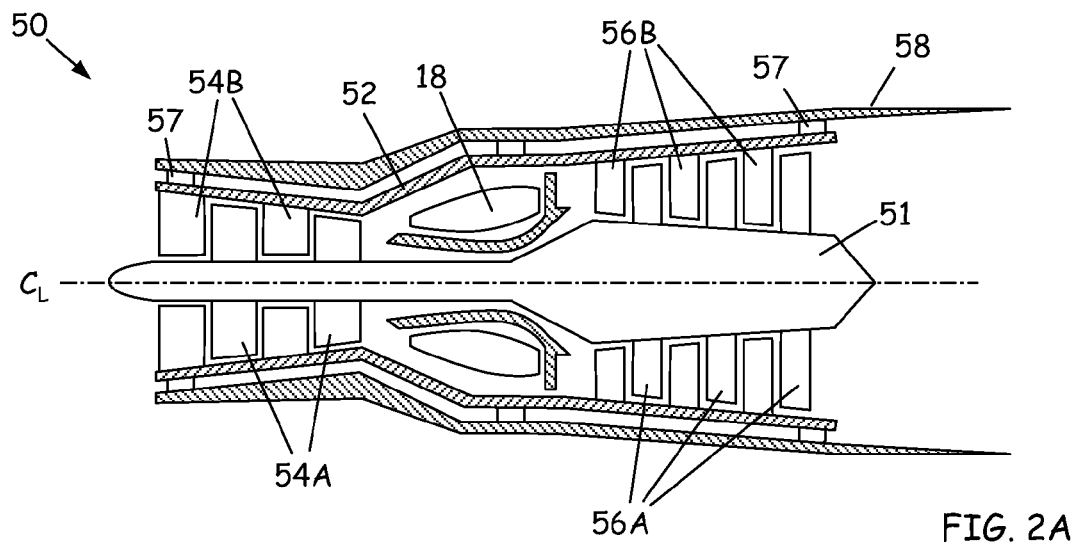
FIG. 2A is a cross-sectional view of a gas turbine engine with counter-rotating, coaxially nested spools.

FIG. 2A is a cross-sectional view of gas turbine engine 50 with counter-rotating, coaxially nested spools 51 and 52. Inner diameter (ID) spool 51 couples compressor rotor stages 54A to co-rotating turbine stages 56A. Outer diameter (OD) spool 52 couples counter-rotating compressor stages 54B to counter-rotating turbine stages 56B.

Gear or bearing mechanisms 57 support outer (counter-rotating) spool 52 within stationary casing 58. Outer spool 52 is coaxially oriented about inner spool 51, each rotating about engine centerline $C_L$ in different directions, and stationary casing 58 is coaxially oriented about outer spool 52. The flow duct is defined between the inner and outer flow margins formed by co-rotating (inner) spool 51 and counter-rotating (outer) spool 52.

In operation of gas turbine engine 50, air is compressed in counter-rotating compressors stages 54A and 54B, and mixed with fuel in combustor 18 to generate combustion gas. Expanding combustion gas drives counter-rotating turbine stages 56A and 56B. The first set of turbine rotor stages 56A drives the first set of compressor rotor stages 54A into co-rotation along inner spool 51, and the second set of turbine rotor stages 56B drives the second set of compressor rotor stages 54B into counter-rotation (or contra-rotation) along outer spool 52.

In contrast to traditional turbine designs, the two sets of axially sequential and adjacent compressor and turbine stages (compressor stages 54A and 54B; turbine stages 56A and 56B) counter-rotate, without intervening vanes or other structures to provide turning flow. This reduces the total blade count, as described above, and allows for lower rotational speeds, while providing the same net work flow in and out of the working fluid, and the same power output.

Figure 2B:
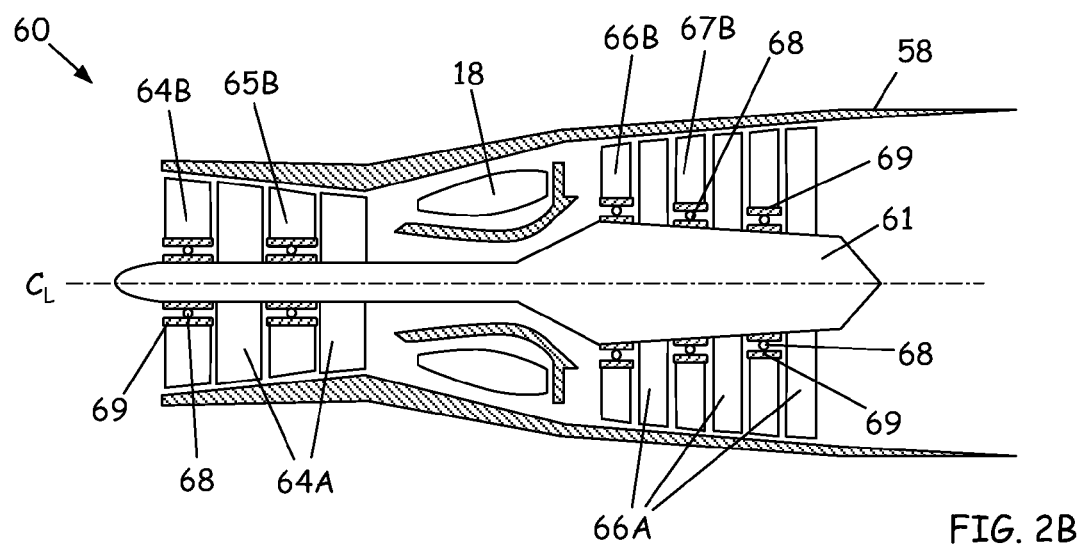
FIG. 2B is a cross-sectional view of a gas turbine engine with individually geared counter-rotating stages.

FIG. 2B is a cross-sectional view of gas turbine engine 60 with individually geared counter-rotating stages. In this configuration, ID spool 61 includes co-rotating compressor stages 64A and turbine stages 66A, interspersed with axially sequential, individually geared counter-rotating compressor stages 64B and 65B, and with corresponding turbine stages 66B and 67B, respectively.

Inner spool 61 is directly coupled to the set of co-rotating stages 64A and 66A, typically at a radially inner region of each rotor blade stage. Thus inner spool 61 co-rotates with stages 64A and 67A, at the same speed and in the same direction about centerline $C_L$. Platform gear mechanisms 68, on the other hand, provide a reverse-rotational geared coupling, so that blade stages 64B, 65B, 66B and 67B counter-rotate about inner spool 61.

Depending on design, the gearing ratios of individual platform gear mechanisms 68 can be selected so that compressor and turbine stages 64B, 65B, 66B and 67B all counter-rotate at the same speed. Alternatively, the gearing ratios are selected to determine different speed ratios for one or more counter-rotating stages 64B, 65B, 66B and 67B.

As shown in FIG. 2B, counter-rotating compressor and turbine stages 64B, 65B, 66B and 67B are mounted with the blade tips oriented in a radially outward sense, with platform gear mechanisms 68 provided in the hub or radially inner platform section 69. Platforms 69 define the inner margin of the flow duct, with the outer margin along stationary outer casing 58.

In one particular example, platform gear mechanisms 68 include sprocket gears mounted between annular or ring gear structures on adjacent surfaces of inner (ID) spool 61 and platforms 69, as shown in FIG. 2. Alternatively, counter-rotating compressor and turbine stages 64B, 65B, 66B and 67B are mounted in a radially inward or cantilevered orientation (see, e.g., FIG. 2A), with platforms 69 in the radially outer direction, and the blade tips in a radially inner direction. In this configuration, the outer (co-rotating) spool may be divided, with platform gear mechanisms 68 coupling one or more counter-rotating compressor or rotor stages 64B, 65B, 66B and 67B to stationary outer case 58.

Figure 3A:
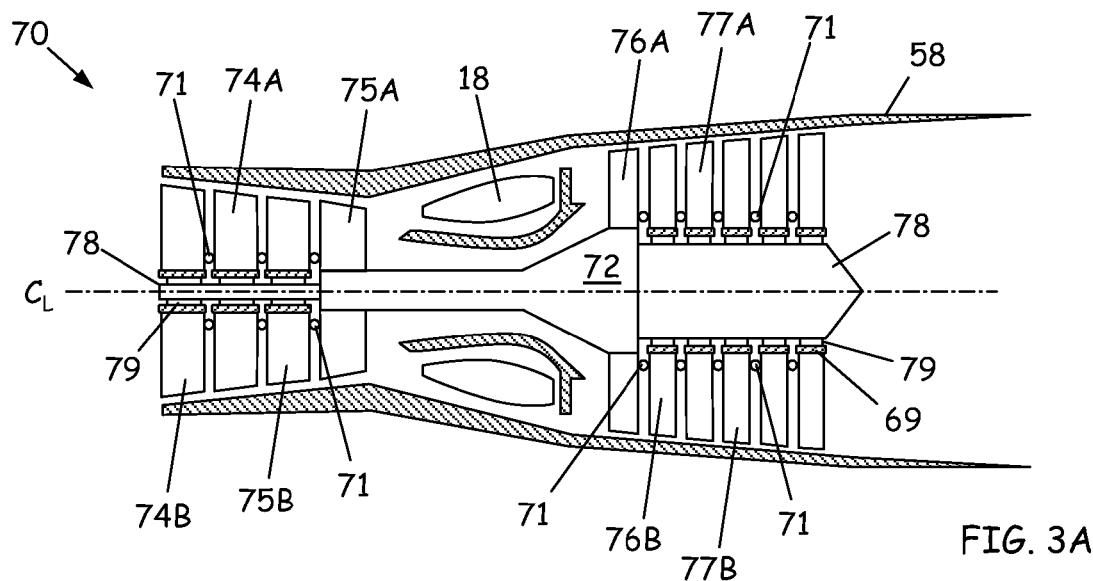
FIG. 3A is a cross-sectional view of a counter-rotating gas turbine engine with inter-row gearing.

FIG. 3A is a cross-sectional view of counter-rotating gas turbine engine 70 with inter-row gearing mechanisms 71. In this configuration, ID spool 72 couples the last (downstream) compressor stage 75A with the first (upstream) co-rotating turbine stage 76A.

As shown in FIG. 3, co-rotating compressor stage 75A drives counter-rotating compressor stage 75B via inter-blade gear mechanism 71, for example a combination ring gear and sprocket drive. Downstream counter-rotating compressor stage 75B is coupled in series to upstream co-rotating compressor stage 74A and upstream counter-rotating compressor stage 74B, using additional inter-blade gear mechanisms 71. The direction of rotation reverses at each axially adjacent rotor stage, as described above.

Inter-blade gear mechanisms 71 also couple first (upstream) co-rotating turbine stage 76A to upstream counter-rotating turbine stage 76B, with downstream co- and counter-rotating turbine stages 77A, 77B (and additional downstream stages) connected in series. Depending on configuration, upstream and downstream compressor and turbine stages 74A, 74B, 75B, 76B, 77A and 77B may be supported from stationary hub structures 78 on radial bearings 79, radially inward of platform sections 69.

In both the turbine and compressor sections of gas turbine engine 70, the gearing is selected to control the load transfer between axially adjacent counter-rotating stages, and to determine the speed ratio for each individual rotor. The direction of rotation reverses at each adjacent stage, without the need for stator vane stages in between the rotor stages, in order to turn the working fluid flow. In addition, individual gearing mechanisms 77 need only transfer loads from one blade row to the next, without being required to carry the load of the entire compressor or turbine ensemble.

Figure 3B:
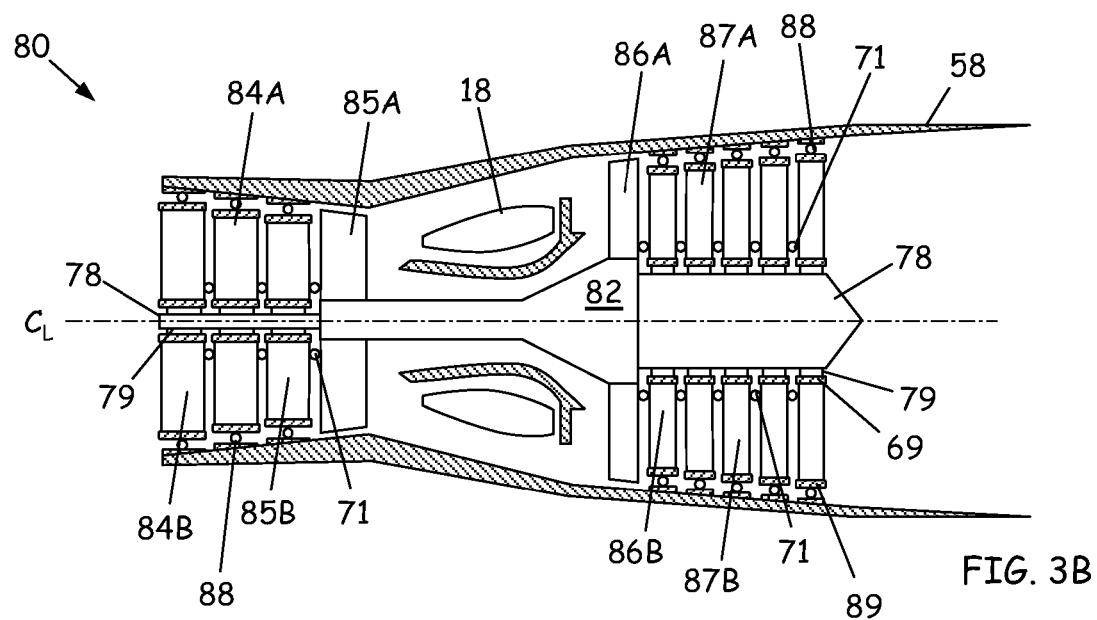
FIG. 3B is a cross-sectional view of a counter-rotating gas turbine engine with endwall gearing.

FIG. 3B is a cross-sectional view of counter-rotating gas turbine engine 80, with both inter-row and endwall gearing. In this configuration, low spool 82 couples downstream compressor rotor stage 85A to upstream co-rotating turbine stage 86A, with upstream and downstream compressor and turbine stages 84A, 84B, 85B, 86B, 87A, 87B (and additional stages) driven in counter-rotational sequence via inter-blade gear mechanisms 71, as described above.

Blade tip (endwall) gear mechanisms 88 are also provided in the blade tip or shroud region, for example in a ring or sprocket gear configuration, or a combination thereof. In this configuration, the flow duct is defined between inner platforms 69, and outer shrouds 89.

In each of the examples and configurations described here, the elimination of stator (turning) airfoil stages reduces weight and complexity, and reduces axial length and overall size envelope of the gas turbine engine. Counter- and contra-rotating engine designs also reduce torque transfer and rotor speeds, as detailed above.

Nonetheless, the relative Mach number between adjacent, counter-rotating stages can still be high, and it is necessary to lessen the severity or magnitude of the velocity triangles between stages (that is, the components of the relative flow velocity vectors), in order to maintain performance at both on-design and off-design speeds, loads, and power outputs. This is accomplished by endwall contraction, as described below.

Figure 4A:
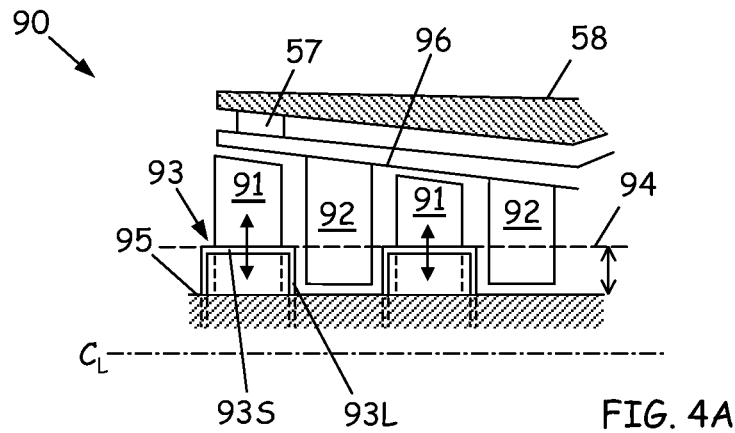
FIG. 4A is cross-sectional view of a turbomachine with counter-rotating stages and n-shaped variable endwall segments.

FIG. 4A is cross-sectional view of turbomachine 90 with co-rotating rotor blade (airfoil) stages 91 and counter-rotating rotor blade (airfoil) stages 92. Turbomachine 90 forms a compressor or turbine section, or a portion thereof, for example in a gas turbine engine as described above. Rotor stages 91 and 92 are positioned in an alternate, adjacent, counter-rotating series within turbomachine 90, without stator vanes or other stationary structures interspersed therebetween.

As shown in FIG. 4A, co-rotating stages 91 include n-shaped variable endwall segments 93 to control the flow through turbomachine 90. In this configuration, endwall segments 93 include radially extending leg portions 93L, upstream and downstream of rotor blade stages 91, and an axially extending top region 93S, which forms a flow surface across connecting legs 93L.

In traditional counter-rotating turbomachinery, variable pitch and pivoting blades are utilized to address issues of off-design operation, including variable flow velocity and different rotational speeds. Turbomachine 90, however, may utilize fixed-pitch co- and counter-rotating stages 91 and 92, with variable endwall segments 93 to control the flow.

When endwall segments 93 are deployed, they are positioned radially upward from the hub or inner flow path region, between individual blades in rotor stages 91, forming an effective or variable inner endwall 94 (dashed line) to control the working fluid flow through turbomachine 90. Variable inner endwall 94 reduces the cross-sectional area of the flow duct formed between the hub at ID flow boundary 95, and the outer flow boundary at OD flow boundary 96. As the flow area decreases, the flow velocity increases.

When endwall segments 93 are retracted, they are positioned radially downward toward the hub or inner flow path region. Variable inner endwall 94 increases the cross-sectional area between ID flow boundary 95 and OD flow boundary 96, decreasing the flow velocity.

Variable endwall segments 93 are radially positioned to move effective endwall 94 radially inward and outward between ID boundary 95 and OD boundary 96. The effect is to increase or decrease the cross-sectional area for working fluid flow through turbomachine 90, controlling the fluid flow by decreasing or increasing the axial flow velocity and the relative loading on co- and counter-rotating blade stages 91 and 92.

In the example of FIG. 4A, endwall contraction is performed from the hub (ID flow boundary 95), in order to establish a higher mean flow radius. When variable endwall segments 93 move radially out, the mean flow radius and axial flow velocity are higher, increasing loading on the blade tip region of co-rotating stages 91. Conversely, when variable endwall segments 93 move radially in, the mean flow radius and axial flow velocity are lower, decreasing loading on the tip region of co-rotating stages 91.

The effect on counter-rotating stages 92 depends on rotor blade configuration. In the cantilevered orientation of FIG. 4A, for example, positioning endwall segments 93 to increase the average flow radius and flow velocity will reduce loading in the blade tip region of counter-rotating stages 91. Alternatively, when counter-rotating stages 92 are oriented with the blades tips radially outward, as shown in FIGS. 2B, 3A and 3B, the effect is to increase loading in the blade tip region, along with co-rotating stages 91. Variable endwall segments 93 can thus achieve either a cooperative (substantially the same) or complementary (substantially different) effect on co-rotating and counter-rotating stages 91 and 92, providing independent or coordinated control of the loading on individual rotor stages, and corresponding rotor speeds.

Figure 4B:
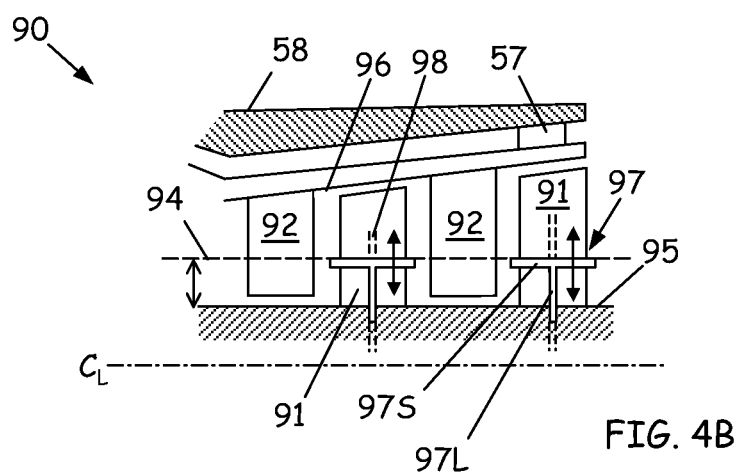
FIG. 4B is cross-sectional view of a turbomachine with counter-rotating stages and t-shaped variable endwall segments.

FIG. 4B is cross-sectional view of turbomachine 90 with co-rotating stages 91 and counter-rotating stages 92, as described above. In this configuration, variable endwall segments 97 are formed as t-shaped members, with a single leg portion 97L extending radially to top portion 97S, which forms an axially extending flow surface upstream and downstream of leg portion 97L.

The blades airfoils in co-rotating stage 91 are provided with radial slots 98 to accommodate motion of leg portions 97L, and to provide structural support for positioning axial surfaces 97S of variable endwall 94. In other respects, variable endwall segments 97 of FIG. 4B provide the same flow control functions of variable endwall segments 93 of FIG. 4A, described above.

Figure 4C:
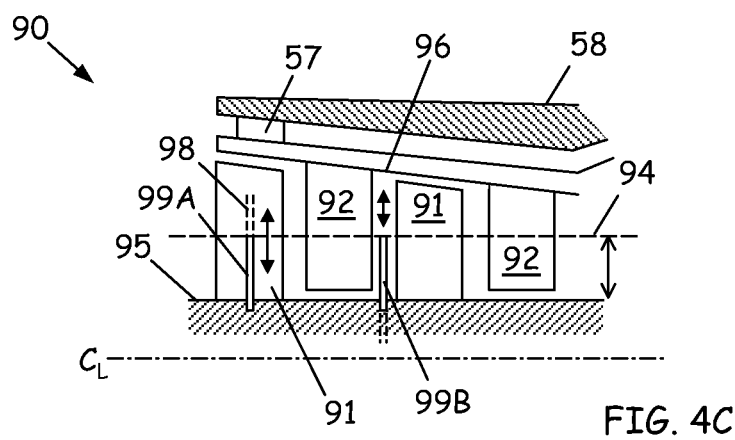
FIG. 4C is cross-sectional view of a turbomachine with counter-rotating stages and a disc-shaped variable endwall.

FIG. 4C is cross-sectional view of turbomachine 90 with co-rotating stages 91 and counter-rotating stages 92, as described above. In this configuration, variable endwall segments 99A and 99B form disc structures, with variable endwall 94 positioned at the circumference of the disc, and at particular radius from centerline $C_L$, above ID boundary 95.

Variable inner endwall 94 with endwall segments 99A and 99B is radially positioned to control flow within turbomachine 90 by changing the cross-sectional flow area between ID flow boundary 95 and OD flow boundary 96, as described above. Variable endwall segments 99A co-rotate with rotor stages 91, and extend along radial slots 98 in the blade airfoils. Variable endwall segments 99B are positioned between co- and counter-rotating stages 91 and 92, and can either be stationary or may rotate with axially upstream (co-rotating) rotor stage 92, or with axially downstream (counter-rotating) rotor stage 91.

In one example, variable endwall segments 99A and 99B are formed of overlapping arcuate segments, which expand or fan out to form variable inner endwall 94 with a continuous circumference about centerline $C_L$ of turbomachine 90. Similar structures may also be used for variable endwall segments 93 and 97 of FIGS. 4A and 4B, in order to form continuous variable inner endwalls 94 in FIGS. 4A and 4B. Alternatively, any of variable inner endwalls 94 may be formed with a discontinuous circumference, utilizing circumferentially spaced variable endwall segments 93, 97, 99A or 99B.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. A turbomachine comprising:
   a flow duct comprising coaxially arranged radially inner and outer endwalls;
   a first set of axially spaced rotor stages arranged between the inner and outer endwalls, each of the first set of rotor stages rotating in a first direction;
   a second set of axially spaced rotor stages arranged between the inner and outer endwalls, each of the second set of rotor stages rotating in a second direction;
   wherein the first and second sets of rotor stages alternate in axial series, such that axially adjacent rotor stages rotate in different directions; and
   a set of variable endwall segments arranged along the inner endwall of the flow duct, wherein the variable endwall segments are radially positionable to regulate loading on the first and second sets of rotor stages by changing a flow area between the inner and outer endwalls.

2. The turbomachine of claim 1, further comprising an inner spool coupled to each of the first set of rotor stages in a radially inner region, the inner spool co-rotating with the first set of rotor stages.

3. The turbomachine of claim 2, further comprising an outer spool arranged coaxially about the inner spool and coupled to each of the second set of rotor stages in a radially outer region, the outer spool counter-rotating with the second set of rotor stages.

4. The turbomachine of claim 2, further comprising platform gear mechanisms coupling the inner spool to each of the second set of rotor stages in a radially inner platform region, such that the second set of rotor stages counter-rotate about the inner spool.

5. The turbomachine of claim 4, wherein the platform gear mechanisms are configured to counter-rotate the second set of rotor stages at different speeds about the inner spool.

6. The turbomachine of claim 1, wherein the first and second set of rotor stages form a compressor section and a turbine section in axial series along the flow duct.

7. The turbomachine of claim 6, wherein the first and second pluralities of rotor stages alternate in an axially adjacent series in each of the compressor section and the turbine section, such that axially adjacent compressor rotor stages rotate in different directions and axially adjacent turbine rotor stages alternate in different directions.

8. The turbomachine of claim 7, further comprising an inner spool coupling a compressor rotor stage in the first set of rotor stages to a turbine rotor stage in the first set of rotor stages, such that the compressor rotor stage co-rotates with the turbine rotor stage.

9. The turbomachine of claim 7, further comprising inter-row gear mechanisms coupling the first set of rotor stages to the second set of rotor stages, such that axially adjacent compressor and turbine rotor stages rotate in opposite directions.

10. The turbomachine of claim 7, further comprising inter-row gear mechanisms coupling the first set of rotor stages to the second set of rotor stages in the turbine section, such that the axially adjacent turbine rotor stages rotate in opposite directions.

11. The turbomachine of claim 1, further comprising blade tip gear mechanisms coupling the second set of rotor stages to a stationary casing, the stationary casing arranged coaxially about the first and second pluralities of turbine rotor stages.

12. The turbomachine of claim 1, wherein the variable endwall segments comprise n-shaped members having two radial legs and an axial surface, the axial surfaces of the n-shaped members being positionable in the radial direction to increase or decrease the flow area.

13. The turbomachine of claim 1, wherein the variable endwall segments comprise t-shaped members having a radial leg and an axial surface, the axial surfaces of the t-shaped members being positionable in the radial direction to increase or decrease the flow area.

14. The turbomachine of claim 1, wherein the variable endwall segments comprise arcuate elements forming a disc-shaped variable inner endwall, the variable inner endwall being positionable in the radial direction to increase or decrease the flow area.

15. The turbomachine of claim 1, further comprising radial slots formed in airfoil components of the first set of rotor stages, the variable endwall segments being positionable in the radial direction along the radial slots.

16. An engine comprising:
   a flow duct comprising an inner flow boundary arranged about an axis and an outer flow boundary coaxially arranged about the inner flow boundary;
   a compressor section comprising co-rotating compressor rotor stages interspersed with counter-rotating compressor rotor stages in series along the axis of the flow duct, wherein axially adjacent compressor rotor stages rotate in opposite directions about the axis;

a turbine section comprising co-rotating turbine rotor stages interspersed with counter-rotating turbine rotor stages in series along the axis of the flow duct, wherein axially adjacent turbine rotor stages rotate in opposite directions about the axis; and a variable inner endwall comprising inner endwall segments, each of the inner endwall segments being radially positionable to regulate loading in the compressor and turbine sections by changing a flow area between the variable inner endwall and the outer flow boundary.

17. The engine of claim 16, further comprising a co-rotating spool coupling the co-rotating compressor rotor stages to the co-rotating turbine rotor stages.

18. The engine of claim 17, further comprising a counter-rotating spool coupling the counter-rotating compressor rotor stages to the counter-rotating turbine rotor stages.

19. The engine of claim 17, further comprising gear mechanisms coupling the co-rotating spool to the counter-rotating compressor and turbine rotor stages, such that the counter-rotating compressor and turbine rotor stages counter-rotate about the co-rotating spool.

20. The engine of claim 16, further comprising gear mechanisms coupling the co-rotating compressor and turbine rotor stages to the counter-rotating compressor and turbine rotor stages, such that the axially adjacent compressor and turbine rotor stages rotate in opposite directions.

21. A gas turbine engine comprising:
a flow duct;
a compressor section comprising a plurality of co-rotating compressor rotor stages interspersed with a plurality of counter-rotating compressor rotor stages, such that axially adjacent compressor rotor stages rotate in opposite directions; and a turbine section comprising a plurality of co-rotating turbine rotor stages interspersed with a plurality of counter-rotating turbine rotor stages, such that axially adjacent turbine rotor stages rotate in opposite directions;

a variable inner endwall comprising a plurality of inner endwall segments circumferentially arranged about an inner diameter of the flow duct, wherein the inner endwall segments are positionable in a radial direction to regulate loading on the compressor and turbine sections by changing a cross-sectional area of the flow duct.

22. The gas turbine engine of claim 21, further comprising a spool coupling the co-rotating compressor rotor stages to the co-rotating turbine rotor stages.

23. The gas turbine engine of claim 22, further comprising gearing mechanisms coupling the spool to the counter-rotating compressor and turbine rotor stages, such that the counter-rotating compressor and turbine rotor stages counter-rotate about the spool.

24. The gas turbine engine of claim 21, further comprising a propulsion rotor coupled to the compressor section.

25. The gas turbine engine of claim 24, further comprising radial slots in airfoil members of the counter-rotating turbine rotor stages, wherein the inner endwall segments are positionable in the radial direction along the radial slots to control loading on the propulsion rotor.

* * * * *